United States Patent
Dobler (10) Patent No.: US 10,823,914 B2
(45) Date of Patent: Nov. 3, 2020

(54) PLUG-IN CONNECTION (71) Applicant: NEUTRIK AG, Schaan (LI)

(72) Inventor: Oliver Dobler, Ruggell (LI)

(73) Assignee: Neutrik AG, Schaan (LI)

( * ) Notice: Subject to any disclaimer, the term of this patent is extended or adjusted under 35 U.S.C. 154(b) by 35 days.

(21) Appl. No.: 16/245,751

(22) Filed: Jan. 11, 2019

(65) Prior Publication Data
US 2019/0227239 A1 Jul. 25, 2019

(30) Foreign Application Priority Data

Jan. 23, 2018 (DE) .......................... 10 2018 101 431

(51) Int. Cl.
*H01R 13/64* (2006.01)
*G02B 6/38* (2006.01)
(Continued)

(52) U.S. Cl.
CPC ......... *G02B 6/3825* (2013.01); *G02B 6/3849* (2013.01); *G02B 6/3865* (2013.01);
(Continued)

(58) Field of Classification Search
CPC .. G02B 6/3825; G02B 6/3879; G02B 6/3869; G02B 6/3865; G02B 6/3849; G02B 2006/4297; H01R 13/64; H01R 13/502; H01R 13/625; H01R 13/71; H01R 13/6453

See application file for complete search history.

(56) References Cited

U.S. PATENT DOCUMENTS 3,725,840 A 4/1973 Hesse
6,234,683 B1 * 5/2001 Waldron ................ G02B 6/383
385/77
(Continued)

FOREIGN PATENT DOCUMENTS

CN 105431983 3/2016
CN 107548531 1/2018
(Continued)

Primary Examiner — Truc T Nguyen
(74) Attorney, Agent, or Firm — Volpe Koenig (57) ABSTRACT

A plug-in connection for the transmission of electric current having a male connector and a female connector, wherein the male connector includes a plug-in extension having electrical contacts, and the female connector includes a plug-in extension receptacle having electrical mating contacts, and at least one projection is arranged on one jacket wall, and the other of these jacket walls incorporates at least one receptacle slot which matches the projection. The plug-in extension, with the projection and the receptacle slot in an undamaged state, can only be inserted into the plug-in extension receptacle from an unambiguously defined plug-in position. The male connector, in the plug-in extension interior, additionally incorporates at least one moulding, and the female connector, in the plug-in extension receptacle interior, additionally incorporates at least one mating moulding, and the moulding and the mating moulding, in combination, constitute a stop mechanism for the prevention of any electrical contacting of the electrical contacts with the electrical mating contacts.

8 Claims, 4 Drawing Sheets

(51) Int. Cl.
*H01R 13/502* (2006.01)
*H01R 13/71* (2006.01)
*H01R 13/625* (2006.01)
*G02B 6/42* (2006.01)

(52) U.S. Cl.
CPC ......... *G02B 6/3869* (2013.01); *G02B 6/3879* (2013.01); *H01R 13/502* (2013.01); *H01R 13/64* (2013.01); *G02B 2006/4297* (2013.01); *H01R 13/625* (2013.01); *H01R 13/71* (2013.01)

(56) References Cited

U.S. PATENT DOCUMENTS

| | | | |
|---|---|---|---|
| 6,394,856 | B1 | 5/2002 | Wertz |
| 10,389,062 | B2 | 8/2019 | Zebhauser et al. |
| 10,530,097 | B2 | 1/2020 | Muhlfellner et al. |
| 2002/0097964 | A1* | 7/2002 | Roehrs ................ G02B 6/3878 385/59 |
| 2002/0177373 | A1 | 11/2002 | Shibata et al. |
| 2003/0040228 | A1 | 2/2003 | Finzer et al. |
| 2009/0060420 | A1* | 3/2009 | Cull .................... G02B 6/3879 385/62 |
| 2011/0021057 | A1* | 1/2011 | Katagiyama ....... H01R 13/6278 439/345 |
| 2011/0158586 | A1* | 6/2011 | Katagiyama ......... G02B 6/3847 385/55 |
| 2012/0129375 | A1* | 5/2012 | Van Swearingen ...... H01R 9/05 439/314 |
| 2015/0260924 | A1* | 9/2015 | Huang ................ G02B 6/3831 385/60 |
| 2016/0266326 | A1* | 9/2016 | Gniadek ................ H01R 24/20 |
| 2017/0179631 | A1* | 6/2017 | Feldchtein ............. H01R 13/64 |
| 2017/0343741 | A1* | 11/2017 | Coenegracht ........ G02B 6/3821 |
| 2018/0136412 | A1* | 5/2018 | Matsui ................ G02B 6/3871 |
| 2018/0364424 | A1* | 12/2018 | Ott ........................ G02B 6/3893 |
| 2019/0004261 | A1* | 1/2019 | Koch ................... G02B 6/3897 |

FOREIGN PATENT DOCUMENTS

| | | |
|---|---|---|
| DE | 102011113062 | 3/2013 |
| EM | 001229827-0001 | 8/2010 |
| EM | 001229827-0006 | 8/2010 |
| EM | 001393623-0001 | 12/2013 |
| EM | 001393623-0002 | 12/2013 |
| EM | 002677641-0001 | 4/2015 |
| EP | 2209171 | 7/2010 |
| JP | H06151003 | 5/1994 |
| JP | 2007258058 | 10/2007 |
| WO | 2019138196 | 7/2019 |

* cited by examiner

PLUG-IN CONNECTION

INCORPORATION BY REFERENCE

This application claims the benefit of German Patent Application No. DE 102018101431.7, filed Jan. 23, 2018.

BACKGROUND

The present invention relates to a plug-in connection for the transmission of electric current having a male connector and a female connector, wherein the male connector comprises a plug-in extension having a plug-in extension jacket wall and electrical contacts, wherein the electrical contacts are arranged in a plug-in extension interior which is enclosed by the plug-in extension jacket wall, and the female connector comprises a plug-in extension receptacle having a plug-in extension receptacle jacket wall and electrical mating contacts, wherein the electrical mating contacts are arranged in a plug-in extension receptacle interior which is enclosed by the plug-in extension receptacle jacket wall, wherein at least one projection is arranged on a jacket wall, which is either the plug-in extension jacket wall or the plug-in extension receptacle jacket wall, and the other of these jacket walls comprises at least one receptacle slot which matches the projection, wherein the plug-in extension, with the projection and the receptacle slot in an undamaged state, from an unambiguous plug-in position which is defined by the projection and the receptacle slot, can only be inserted into the plug-in extension receptacle in one plug-in direction.

Plug-in connections of this type for the transmission of electric current are known from the prior art, and are disclosed e.g. in registered community designs 001229827, specifically 001229827-0001 and -0006, 002677641, specifically 002677641-0001, and 001393623-0001 and -0002. By means of the projections and the respectively corresponding receptacle slots, in the event of proper use according to the prior art, the plugging together of non-matching plug-in connectors is prevented. It is further ensured that, in proper use, matching plug-in connectors can only be plugged together in the defined or intended plug-in position.

However, practice has shown that, in the event of improper use, but also in the event of wear to the projections and/or receptacle slots, it can occur that the plug-in connectors are plugged together in an unintended position and/or combination. As a result, it can inadvertently occur that the electrical contacts are electrically contacted with electrical mating contacts which are not intended for this purpose, i.e. are connected thereto in an electrically conductive manner. This can endanger both the cables and devices which are connected to the plug-in connector, and the persons using said cables and devices or plug-in connector.

SUMMARY

The object of the invention is the provision of an additional measure whereby, in plug-in connections of the above-mentioned type, it can be prevented that, by the plugging together of non-matching plug-in connectors and/or by the inadvertent plugging together of plug-in connectors in an unintended position for this, incorrect electrical contacting of the electrical contacts with the electrical mating contacts occurs.

For the fulfillment of this objective is achieved with a plug-in connection according to one or more features of the invention.

In the invention, it is thus provided that the male connector, in the plug-in extension interior, additionally incorporates at least one moulding, and the female connector, in the plug-in extension receptacle interior, additionally incorporates at least one mating moulding, wherein the moulding and the mating moulding, in combination, constitute a stop mechanism for the prevention of any electrical contacting of the electrical contacts with the electrical mating contacts in the event of the plugging of the plug-in extension into the plug-in extension receptacle from a position which deviates from the unambiguously defined plug-in position.

By means of the moulding in the plug-in extension interior of the male connector and the mating moulding in the plug-in extension receptacle interior of the female connector, an additional safety measure is thus provided, which prevents any inadvertent incorrect connection of the electrical contacts of the male connector with the electrical mating contacts of the female connector in an electrically conductive manner, i.e. the electrical contacting thereof. In the event that, in the male and/or female connectors of plug-in connections according to the invention, friction, erosion or any other form of wear results in damage to, or even the complete loss of the projections and/or receptacle slots, such that these can no longer ensure that the male and female connectors can only be plugged together, from the unambiguously defined plug-in position, i.e. in the manner actually intended, the moulding and the corresponding mating moulding thus still constitute an additional safety measure which, in the event of the incorrect plugging together of the female and male connectors, continues to ensure, at least, that there is no incorrect electrical contacting of the electrical contacts with the electrical mating contacts. The same applies if the connectors, whether deliberately or inadvertently, generally by the corresponding use of force, are incorrectly plugged together. Again, in this case, the cooperation of the moulding and the mating moulding can at least prevent any incorrect electrical contacting of the electrical contacts with the electrical mating contacts.

In general, the projections and/or receptacle slots on the plug-in extension are outward-facing, arranged on a surface or outer surface of the plug-in extension jacket wall which is averted from the plug-in extension interior. They are consequently susceptible to increased wear, and can thus be damaged or even entirely removed. The arrangement of the moulding in the plug-in extension interior and of the mating moulding in the plug-in extension receptacle interior has the advantage, that the moulding and the mating moulding are particularly effectively protected by the corresponding plug-in extension jacket wall or by the corresponding plug-in extension receptacle jacket wall against external influences, and specifically against friction or other impairments, thereby further contributing to the secure prevention of any electrical contacting of the electrical contacts with the respectively incorrect electrical mating contacts. In the interests of completeness, it is indicated that electrical contacting might also be described as the electrically-conductive mutual bonding of the electrical contacts with the electrical mating contacts.

Plug-in connections according to the invention are employed for the transmission of electric current in general. This can involve the transmission of electrical signals, which are transmitted with low electric power ratings, or the electrical transmission of power at correspondingly high current intensities and/or voltages. Plug-in connections according to the invention can thus be designed for both electrical data transmission and for electric power transmission, e.g. for the supply of power to electrical devices. These might also be described as plug-in connections for the transmission of electrical energy and/or electrical signals. Composite forms thereof are also possible. Moreover, plug-in connections according to the invention are also not necessarily restricted to the transmission of electric currents and/or voltages only. Plug-in connections according to the invention can also additionally incorporate e.g. an optical data transmission function or similar.

Both the male connector and the female connector of the plug-in connection according to the invention can be cable connectors, i.e. connectors which are joined directly to the cable, or can also be "chassis connectors", i.e. connectors which are fitted to equipment housings. The female connector can also be described as a socket.

The projections might also be described as elevations, and the receptacle slots might also be described as recesses, indentations or grooves. The projections can be arranged on either the plug-in extension jacket wall or on the plug-in extension receptacle jacket wall, and can project beyond the latter. They can be inward-facing, i.e. toward the respective interior, or can also be outward-facing. Correspondingly, the receptacle slots can also be fitted on either the plug-in extension jacket wall or on the plug-in extension receptacle jacket wall, or incorporated in the respective jacket wall. Composite forms are also conceivable. One, but also a plurality of projections and/or receptacle slots can be provided per jacket wall. Hereinafter, reference is generally made to the projection and the receptacle slot in the singular. However, this is only for linguistic simplification. All the variants of embodiment described hereinafter can incorporate one or more projections, but also one or more receptacle slots. The projections and their corresponding receptacle slots execute a function whereby the male connector, with the projections and receptacle slots in an undamaged state, can only be plugged into the plug-in extension receptacle, in the plug-in direction, from the unambiguous plug-in position which is defined by the projection and the receptacle slot. In simple terms, the projections and receptacle slots, in an undamaged state and subject to correct handling, actually thus ensure that there can be absolutely no incorrect plugging of the male connector into the female connector. As already described above, however, practice has shown that, as a result of damage, wear or any other impairment of projections and receptacle slots, but also as a result of improper handling, it can occur that the plug-in extension of the male connector can be plugged into the plug-in extension receptacle of the female connector from an incorrect position, which deviates from the unambiguously defined plug-in position. In this case, the moulding according to the invention, in cooperation with the corresponding mating moulding, at least prevents the insertion of the male connector into the female connector to the extent that the electrical contacts and the electrical mating contacts are mutually bonded in an incorrect manner. The unambiguous plug-in position which is defined by the projection and the receptacle slot is also described here, in short, as the unambiguously defined plug-in position, or simply as the defined plug-in position.

The receptacle slot corresponding to a respective projection, in its shaping and position, corresponds to the shape and position or location of the corresponding projection such that, with the projection and the receptacle slot in an undamaged state, and subject to proper use, insertion is only possible from the unambiguously defined plug-in position.

The concept of electrical mating contacts is only employed by way of clarification to the effect that these are the electrical contact elements in the female connector. Neither the concept of electrical contacts in the male connector, nor the concept of electrical mating contacts in the female connector implies any expression of the number and physical configuration of the respective electrical contact elements. These can be highly diverse, and can accordingly be configured in a mutually corresponding manner. Both the number of electrical contacts in the male connector and the number of electrical mating contacts in the female connector can vary. There may be one, two, three or more electrical contacts, and correspondingly also one, two, three or more electrical mating contacts. Three electrical contacts are specifically preferred, and correspondingly three electrical mating contacts. In general, in plug-in connections according to the invention, the number of electrical contacts in the male connector corresponds to the number of electrical mating contacts in the female connector.

According to preferred forms of embodiment of the invention, the moulding incorporates at least one stop face and the mating moulding incorporates at least one mating stop face wherein, for the constitution of the stop mechanism, the stop face and the mating stop face, upon the insertion of the plug-in extension into the plug-in extension receptacle, in the plug-in direction, from a position which deviates from the unambiguously defined plug-in position, engage with one another and, for the prevention of the electrical contacting of the electrical contacts with the electrical mating contacts, prevent the complete insertion of the plug-in extension into the plug-in extension receptacle, in the plug-in direction.

The use of the terms moulding and mating moulding, and of the terms stop face and mating stop face, as in the case of electrical contacts and electrical mating contacts, ultimately likewise represents a convention, which is only intended to simplify and standardize the linguistic classification of male or female connectors. Consequently, these terms imply no further expression of the specific configuration and arrangement in the respective plug-in connector.

According to particularly preferred forms of embodiment of the invention, the moulding is arranged centrally in the plug-in extension interior, preferably on a longitudinal center line of the plug-in extension. The moulding is preferably located between the electrical contacts in the plug-in extension interior. Advantageously, the same applies to the female connector in an analogous manner. The mating moulding is thus also advantageously arranged centrally in the plug-in extension receptacle interior, preferably on a longitudinal center line of the plug-in extension receptacle. Preferably, the mating moulding is also located between the electrical mating contacts.

As already described above, plug-in connections according to the invention and their male and female connectors respectively can be provided with only one projection and only one corresponding receptacle slot per respective jacket wall, but can also be provided with a plurality of projections and a plurality of receptacle slots. It is thus possible, in the context of the invention, for a plurality, preferably four mutually differently formed and/or mutually differently positioned projections to be arranged on a jacket wall, which is the plug-in extension jacket wall or the plug-in extension receptacle jacket wall, and for the other of these jacket walls to incorporate a number of mutually differently formed and/or mutually differently positionally arranged receptacle slots, corresponding to the number of projections. Both the moulding and the corresponding mating moulding can assume a highly diverse form, in order to constitute the stop mechanism according to the invention and the function thereof. According to preferred variants, one part, which is either the moulding or the mating moulding, at least incorporates a space, in which the other of these parts penetrates upon the insertion of the plug-in extension into the plug-in extension receptacle, in the plug-in direction, from the defined plug-in position. The space can thus be formed on either the moulding or the mating moulding. The respective other part, i.e. correspondingly the mating moulding or the moulding, upon the insertion of the plug-in extension from the unambiguously defined plug-in position, can then correspondingly penetrate said space. In a plan view, specifically viewed in the plug-in direction, the space can be configured with a V-shape. A plurality of spaces, e.g. two mutually-opposite spaces, can also be provided. Advantageously, the part penetrating the space(s), i.e. correspondingly the moulding or the mating moulding, is rotatably mounted in the space, wherein the rotatable mounting thereof between two rotating stops is specifically preferred.

In principle, in plug-in connections according to the invention, it can be provided that, from the unambiguously defined plug-in position, the plug-in extension has to be exclusively inserted linearly into the plug-in extension receptacle, in the plug-in direction, in order to thus achieve the end position in which the electrical contacts are electrically contacted with the electrical mating contacts. However, according to preferred forms of embodiment of the invention, the plug-in extension, from the defined plug-in position, can be inserted into the plug-in extension receptacle in the plug-in direction for the achievement of a fully plugged-in position and, from the fully plugged-in position, is rotatable about the plug-in direction into an end position wherein, in the end position, the electrical contacts are electrically contacted with the electrical mating contacts. The plug-in direction advantageously coincides here with the longitudinal center line of the plug-in extension and the plug-in extension receptacle, or is configured coaxially with the latter. In these forms of embodiment of the invention it is thus provided that the above-mentioned end position, in which the electrical contacts are electrically contacted with the electrical mating contacts, is not achieved until, from the unambiguously defined plug-in position, a linear plug-in process in the plug-in direction has firstly been executed. By this linear plug-in process, the fully plugged-in position is achieved, from which the plug-in extension, preferably the entire male connector, is then rotated about the plug-in direction into the end position.

In this regard, it is advantageous if in the jacket wall, in which the receptacle slot is also arranged, at least one receptacle channel which runs in a circumferential direction and connects to the receptacle slot is arranged, in which receptacle channel the projection is guided during rotation from the fully plugged-in position into the end position.

It is additionally advantageous if the, preferably all the electrical contacts are arranged on a common circuit of electrical contacts and/or that the, preferably all the electrical mating contacts are arranged on a common circuit of electrical mating contacts. Preferably, it is also provided that an outer surface of the plug-in extension jacket wall and/or an inner surface of the plug-in extension receptacle jacket wall, with the exception of the projections or receptacle slots arranged thereupon and/or the receptacle channels arranged thereupon, is or are configured as a circular-cylindrical shell, at least in certain areas.

BRIEF DESCRIPTION OF THE DRAWINGS

Further preferred configurations of plug-in connections according to the invention are described for exemplary purposes in the following description of the figures, with reference to an exemplary embodiment according to the invention. In the figures.

DETAILED DESCRIPTION

Figure 1:
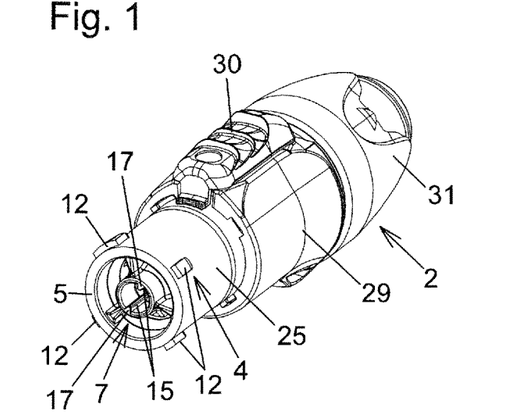
FIGS. 1 to 3 show views of a male connector of a plug-in connection according to the invention.
Figure 2:
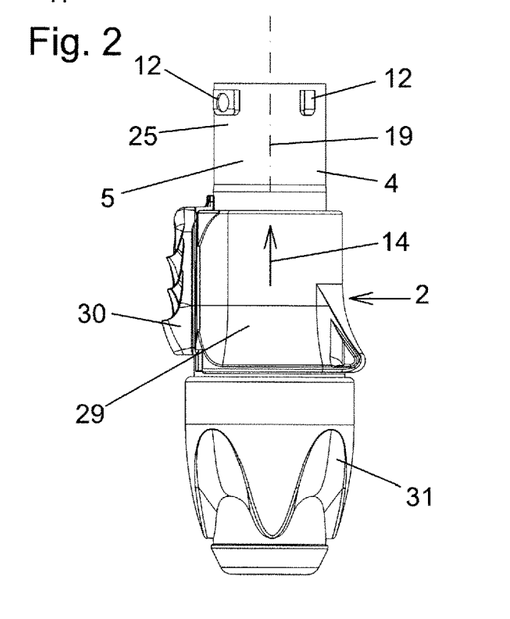
Figure 3:
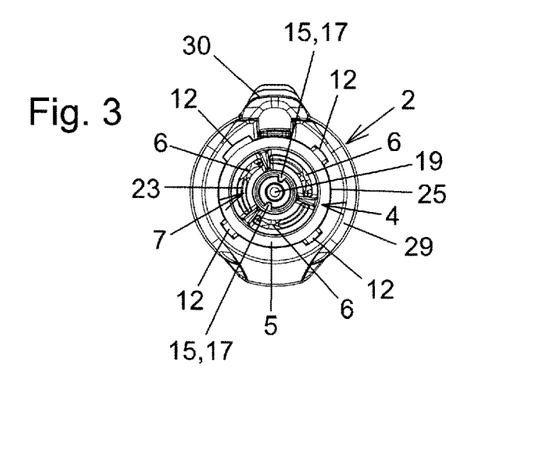
Figure 4:
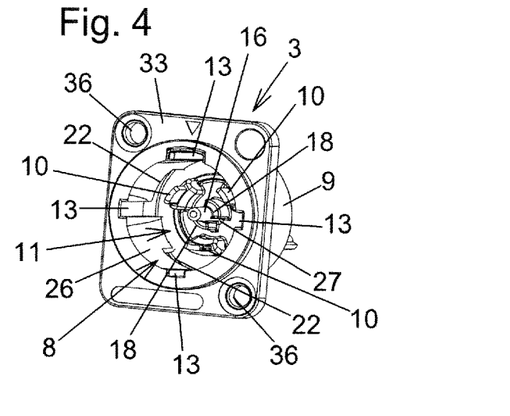
FIGS. 4 to 6 show views of a female connector of the plug-in connection according to the invention.
Figure 5:
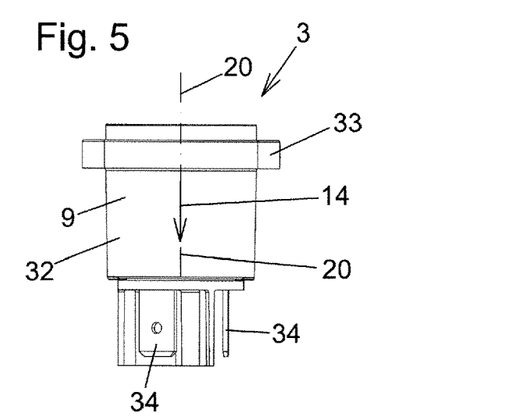
Figure 6:
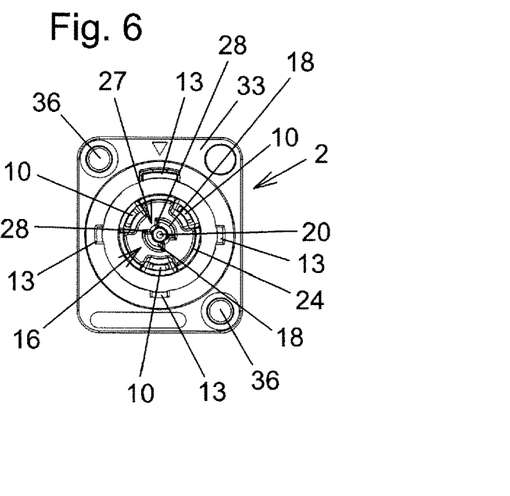

The male connector 2, shown here by way of example, of the plug-in connection 1 according to the invention, is in this example a cable connector, and is represented in a perspective view in FIG. 1 and in a side view in FIG. 2. FIG. 3 shows a view in the direction of the plug-in extension 4 of said male connector 2. The corresponding female connector 3 is configured as a "chassis socket" or "chassis connector", which is provided for attachment to the housing of an electrical device. Naturally, a female connector 3 according to the invention, in the same way as the male connector 2 represented here, might also be configured as a cable connector, with no resulting requirement for the modification of key components of the invention. The same also applies, vice versa, to the male connector 2. In principle, this can also be configured as a chassis connector. The female connector 3 represented here, by means of the fixing holes 36 in the flange 33, can be screwed onto the housing of the electrical device or otherwise attached in a manner known per se. FIG. 4 shows a perspective view of this female connector 3, FIG. 5 shows a side view, and FIG. 6 shows a view of the plug-in extension receptacle interior 11 of said female connector 3 or the plug-in extension receptacle 8 thereof.

The male connector 2, in a manner which is known per se, comprises a housing 29, beyond which the plug-in extension 4 projects. On the opposite side to the plug-in extension 4, the cable grommet 31 is located, through which an electrical cable is fed, in a manner which is known per se, into the male connector 2, where it can be contacted with the electrical contacts 6 of the plug-in extension 4 or male connector 2. In the exemplary embodiment represented, on the exterior of the housing 29 of the male connector 2, a slider 30 which is known per se is also located, which is provided for the release of a stop mechanism which is configured according to the prior art. The housing 29, the cable grommet 31 and the slider 30 are ultimately not relevant to the invention and, in common with the inner workings of the housing 29 and the cable grommet 31, can be configured in a manner which is known per se from the prior art.

The plug-in extension 4 comprises a plug-in extension jacket wall 5 which, in the exemplary embodiment represented, with the exception of the outwardly protruding projections 12 which are arranged thereupon, is configured in the shape of a circular-cylindrical shell, and thus specifically has a circular-cylindrical shell-shaped outer surface 25. In the exemplary embodiment represented, a total of four outwardly protruding projections 12 are arranged on this outer surface 25. These four projections 12 differ with respect to their shape and also with respect to their position. As already described above, there may also be more or fewer, differently shaped and differently arranged projections 12. Corresponding receptacle slots 13 could also equally well be located in the plug-in extension jacket wall 5, if the corresponding projections 12 were to be configured in the plug-in extension receptacle jacket wall 9 of the plug-in extension 4 of the female connector 3. Composite forms, in which both projections 12 and receptacle slots 13 are arranged on both the plug-in extension jacket wall 5 and on the plug-in extension receptacle jacket wall 9, are also conceivable.

In any event, the plug-in extension jacket wall 5 encloses the plug-in extension interior 7, in which the electrical contacts 6 are located. The plug-in extension jacket wall 5, as in the exemplary embodiment represented here, is advantageously configured to a sufficient length, such that the electrical contacts 6 are arranged in a fully-recessed manner within the plug-in extension interior 7, and do not project beyond the latter. In the view into the plug-in extension interior 7 according to FIG. 3, the recessed arrangement of the electrical contacts 6 can clearly be seen. It can also be seen that the latter, in this exemplary embodiment, are arranged on a common circuit 23. According to the invention, the moulding 15, with its outward-facing stop faces 17, is centrally arranged in the plug-in extension interior 7. The form and function of this moulding 15, and specifically the interaction thereof with the mating moulding 16 of the female connector 3, are described in greater detail hereinafter. In this case, the centrally-arranged moulding 15 is located on the longitudinal center line 19 of the plug-in extension 4, and between the electrical contacts 6.

The plug-in extension receptacle jacket wall 9 of the plug-in extension receptacle 8 encloses the plug-in extension receptacle interior 11, in which the electrical mating contacts 10 are arranged. In this exemplary embodiment, all these electrical mating contacts 10 are also arranged on a common circuit 24, and are arranged in a recessed manner in the plug-in extension receptacle interior 11. The external contacts 34, which are connected to the electrical mating contacts 10 in a conductive manner, are employed for the connection of cables or similar, and project to the rear, i.e. on the side which is averted from the flange 33, beyond the housing 32 of the female connector 3. The mating moulding 16 according to the invention, having its two mating stop faces 18, the two spaces 27 and the rotating stops 28, is also centrally arranged in the plug-in extension receptacle interior 11. The longitudinal center line 20 of the plug-in extension receptacle 8 also runs through the mating moulding 16. The plug-in extension receptacle jacket wall 9 has a circular-cylindrical inner surface 26 which, in this exemplary embodiment, is interrupted by the receptacle slot 13. A receptacle channel 22, which is likewise arranged in the plug-in extension receptacle jacket wall 9 and interrupts the inner surface 26, terminates at each receptacle slot 13.

In proper use, the male connector 2, with its plug-in extension 4, from the unambiguous plug-in position which is defined by the projections 12 and the corresponding receptacle slots 13, is plugged into the plug-in extension receptacle 8 in the plug-in direction 14. Accordingly, by the insertion of the plug-in extension 4 into the plug-in extension receptacle 8 to a corresponding extent in the plug-in direction 14, the fully plugged-in position can be achieved, in which, however, the electrical contacts 6 in the present exemplary embodiment are not yet bonded or contacted with the electrical mating contacts 10 in an electrically conductive manner. In order to achieve the end position, in which this is the case, the plug-in extension 4 must firstly be rotated from the fully plugged-in position in the circumferential direction 21, and only then is the electrical contacting of the electrical contacts 6 with the electrical mating contacts 10 is completed in the present exemplary embodiment.

Figure 7:
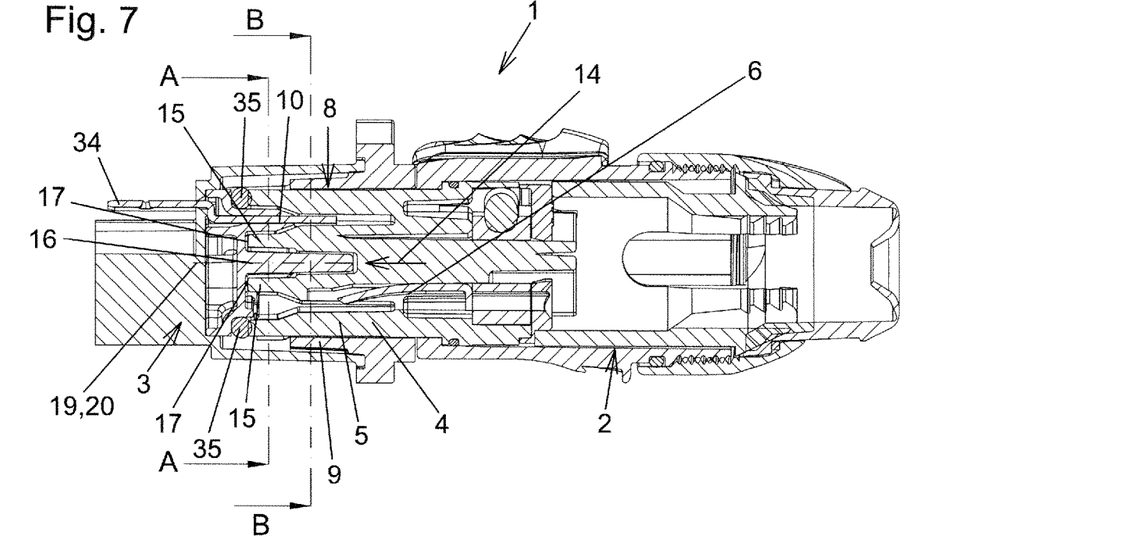
FIG. 7 shows a longitudinal section of the plug-in connection, with the male connector and female connector thereof in the fully plugged-in position, along the section line CC from FIG. 8.
Figure 8:
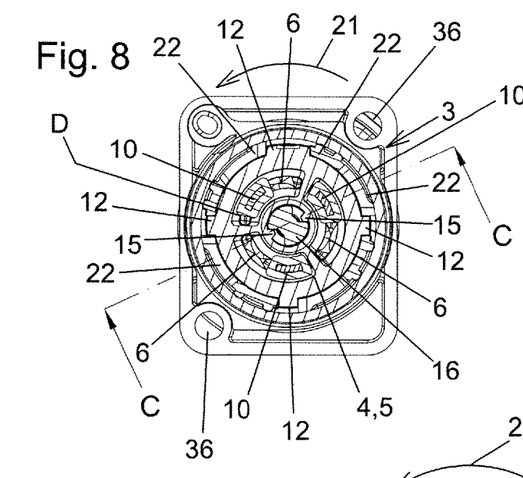
FIG. 8 shows the cross-section along the section line AA from FIG. 7.
Figure 9:
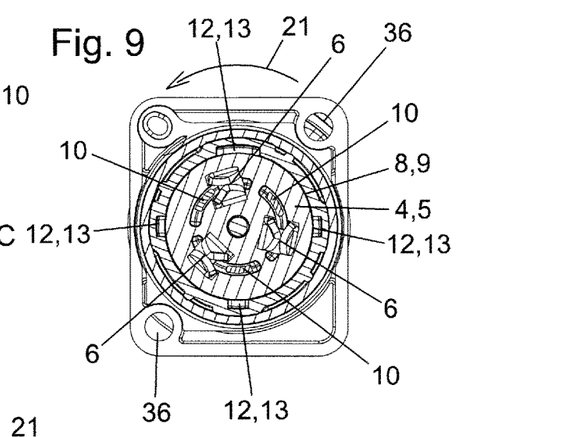
FIG. 9 shows the cross-section along the section line BB from FIG. 8.
Figure 10:
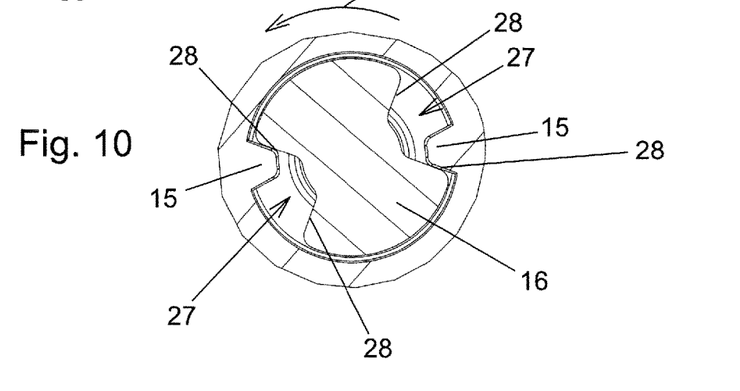
FIG. 10 shows the detail D from FIG. 8.
Figure 11:
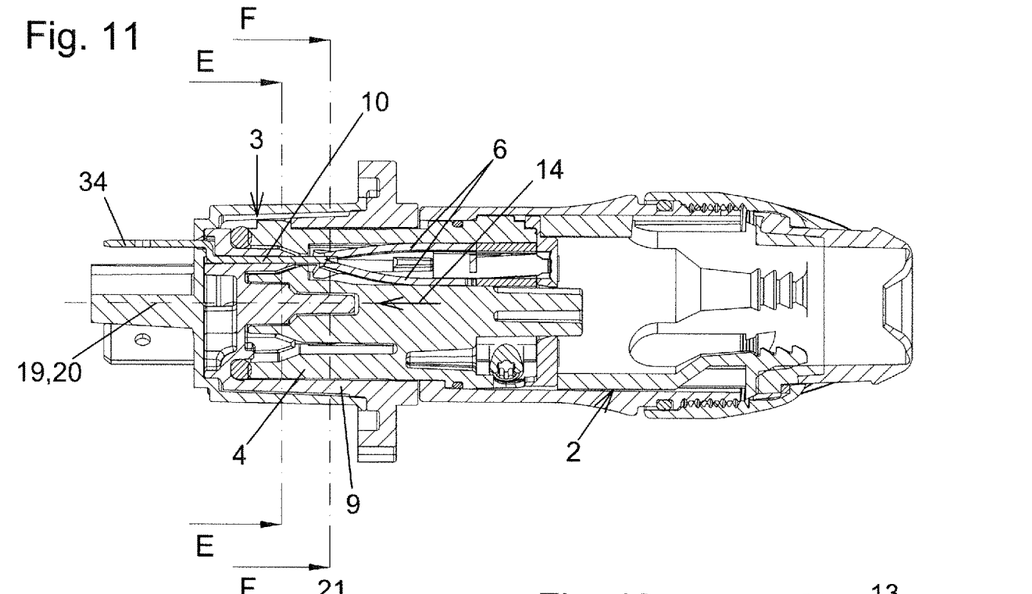
FIG. 11 shows a longitudinal section of this plug-in connection in the end position, in which the electrical contacts are electrically contacted with the electrical mating contacts, along the section line GG from FIG. 12.

In FIGS. 7 to 10, the fully plugged-in position is represented in which, as yet, there is no electrical contacting between the electrical contacts 6 and the electrical mating contacts 10. The latter can be particularly clearly seen from FIG. 9. In FIGS. 7, 8 and 10 it can also clearly be seen that, during this plug-in process, starting from the unambiguous plug-in positions defined by the undamaged projections 12 and the corresponding receptacle slots 13, the lugs of the moulding 15 of the plug-in extension 4 respectively penetrate one of the spaces 27, configured here in a V-shape, in the mating moulding 16, such that the stop faces 17 of the moulding 15, during the plug-in process, also do not engage or cooperate with the mating stop faces 18 on the mating moulding 16.

In the exemplary embodiment of the plug-in connection 1 represented here, a seal 35 which is known per se is located in the plug-in extension receptacle interior 8 of the female connector 3. In the fully plugged-in position, the front end of the plug-in extension jacket wall 5 is compressed against this seal 35.

Figure 12:
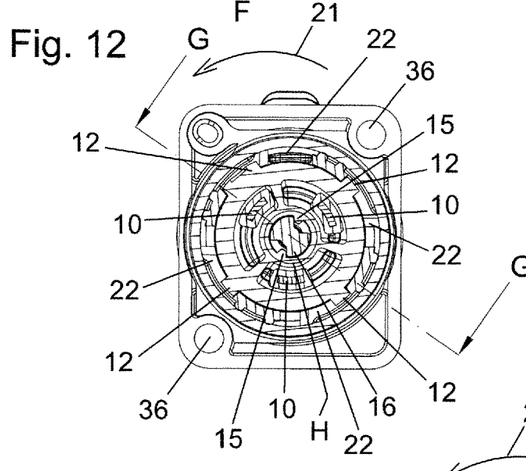
FIG. 12 shows the cross-section along the section line EE from FIG. 11.
Figure 13:
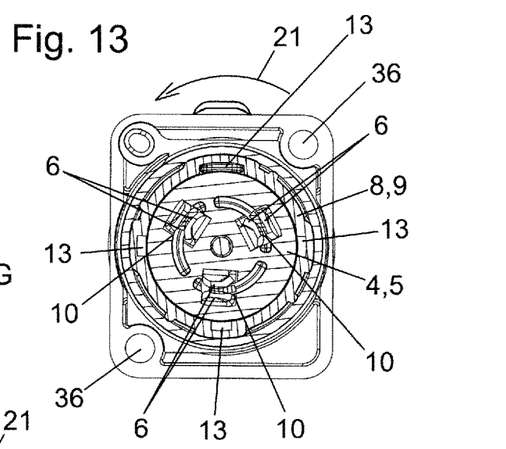
FIG. 13 shows the cross-section along the section line FF from FIG. 11.
Figure 14:
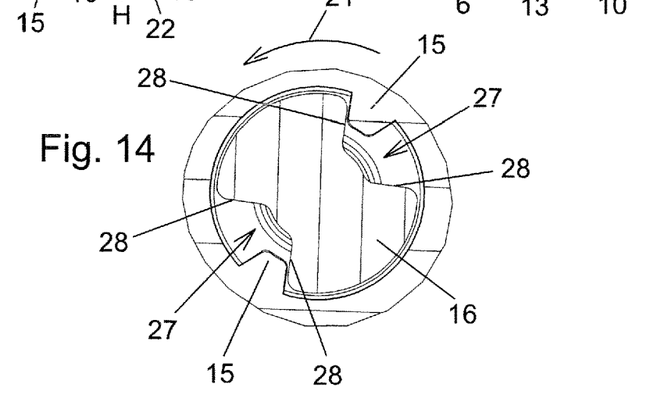
FIG. 14 shows the enlarged detail H from FIG. 12.

For the achievement of the end position according to FIGS. 11 to 14, and thus of the electrical contacting of the electrical contacts 6 with the electrical mating contacts 10, the plug-in extension 4 or the entire male connector 2, from the fully plugged-in position according to FIGS. 7 to 10, is rotated in the circumferential direction 21. The projections 12 of the plug-in extension are thus guided in the receptacle channels 22 of the plug-in extension receptacle jacket wall 9. In the end position represented in FIGS. 11 to 14, the electrical contacts 6 are then bonded with the electrical mating contacts 10 in an electrically conductive manner, as can be particularly clearly seen in FIGS. 11 and 13. In FIG. 12, and specifically in FIG. 14, it can clearly be seen that, by this rotary motion in the circumferential direction 21, the lugs of the moulding 15, and thus the moulding 15 per se, have been rotated in the spaces 27 of the mating moulding 16 from one rotating stop 28—cf. FIG. 10—to another rotating stop 28—cf. FIG. 14. These rotating stops 28 can be employed for the additional limitation of rotary motion in the circumferential direction 21, but the inclusion thereof is not mandatory.

With reference to FIGS. 1 to 14, the proper use of the plug-in connection 1 according to the invention has previously been described, in which the projections 12 and the corresponding receptacle slots 13 are in an undamaged state, and dictate the unambiguous plug-in position.

Figure 15:
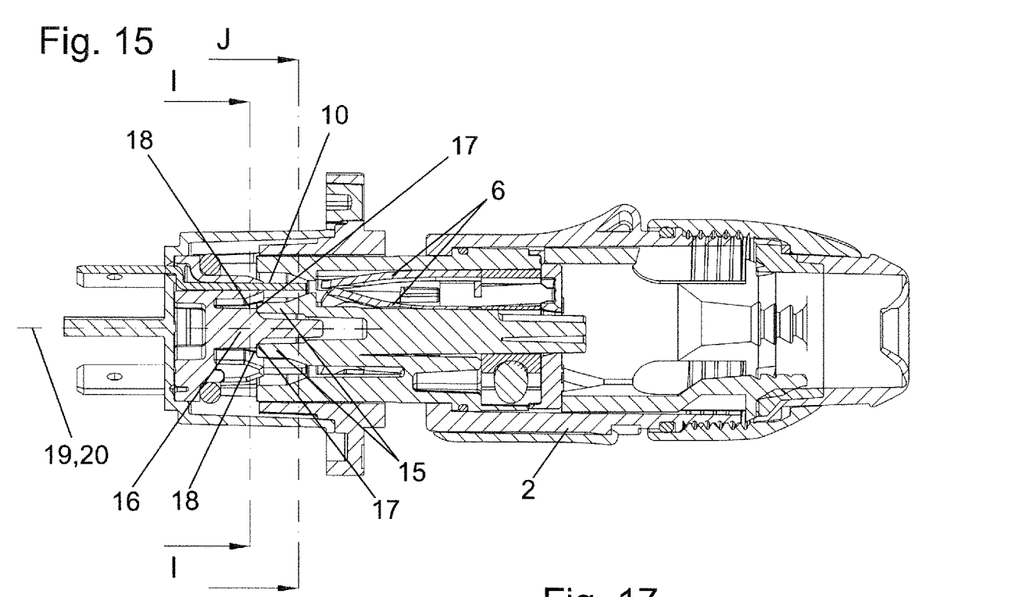
FIG. 15 shows a longitudinal section of the plug-in connection wherein, however, the male connector has been plugged in from a position which deviates from the unambiguously defined plug-in position, along the section line KK from FIG. 16.
Figure 16:
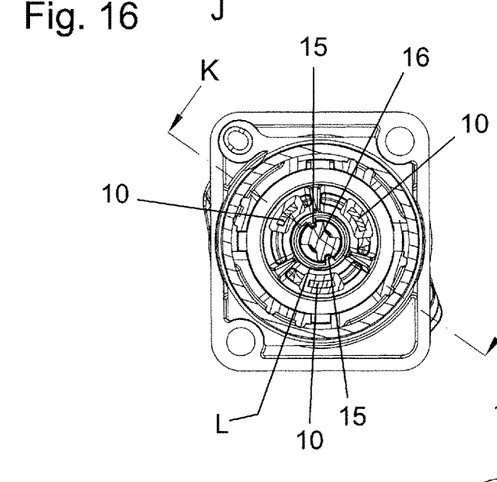
FIG. 16 shows the cross-section along the section line II from FIG. 15.
Figure 17:
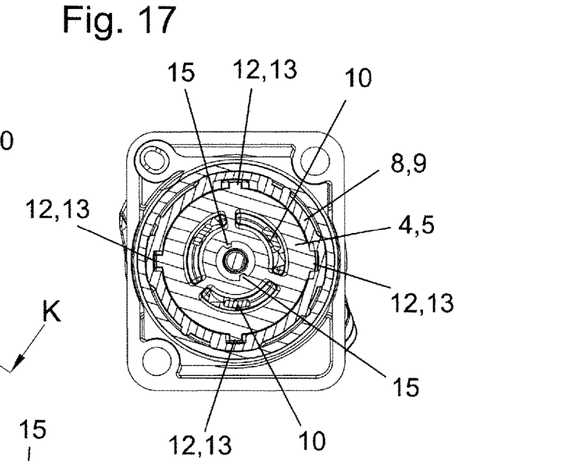
FIG. 17 shows the cross-section along the section line JJ from FIG. 15.
Figure 18:
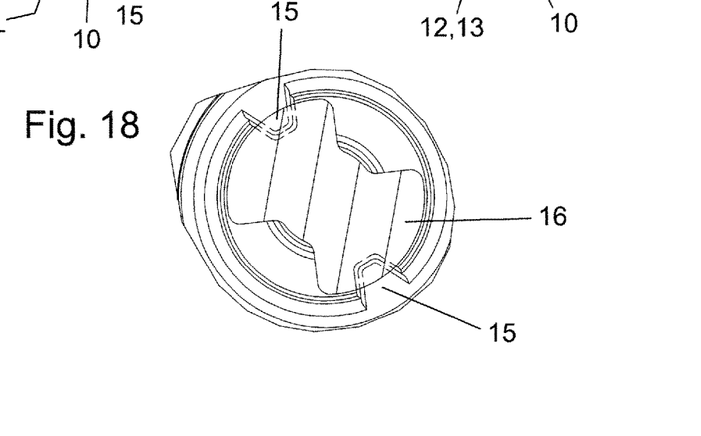
FIG. 18 shows the enlarged detail L from FIG. 16.

As mentioned above, cases have occurred in which, as a result of damage, wear or similar, the projections 12 and/or the receptacle slots 13 have been compromised such that, as a result, or by simply improper use, a plug-in process of the plug-in extension 4 into the plug-in extension receptacle 8 has been executed from a position which deviates from the unambiguously defined plug-in position. FIGS. 15 to 18 represent how, in such a case, the cooperation of the moulding 15 according to the invention with the mating moulding 16 according to the invention constitutes a stop mechanism, which prevents the connection of the electrical contacts 6 with the electrical mating contacts 10 in an electrically conductive manner, or the electrical contacting thereof. In FIGS. 15, 16 and 18 it can clearly be seen how, in this plug-in process, the stop faces 17 of the moulding 15 engage with the mating stop faces 18 of the mating moulding 16 before any electrical connection or contacting of the electrical contacts 6 with the incorrect electrical mating contacts 10 can occur. The cooperation of the moulding 15 and the mating moulding 16, or the stops 17 thereof with the mating stops 18, thus prevents any electrical contacting of the electrical contacts 6 with the electrical mating contacts 10, as the plug-in extension 4 cannot be fully plugged into the plug-in extension receptacle 8 in the plug-in direction 14. This can be particularly clearly seen in FIG. 15 wherein, although the stop faces 17 are already engaged with the mating stop faces 8, the electrical contacts 6 are still arranged with a clearance from the electrical mating contacts 10, and can thus not form any electrically conductive connection with the latter.

| Key to Reference Numbers: | |
|---|---|
| 1 | Plug-in connection |
| 2 | Male connector |
| 3 | Female connector |
| 4 | Plug-in extension |
| 5 | Plug-in extension jacket wall |
| 6 | Electrical contact |
| 7 | Plug-in extension interior |
| 8 | Plug-in extension receptacle |
| 9 | Plug-in extension receptacle jacket wall |
| 10 | Electrical mating contact |
| 11 | Plug-in extension receptacle interior |
| 12 | Projection |
| 13 | Receptacle slot |
| 14 | Plug-in direction |
| 15 | Moulding |
| 16 | Mating moulding |
| 17 | Stop face |
| 18 | Longitudinal center line |
| 20 | Longitudinal center line |
| 21 | Circumferential direction |
| 22 | Receptacle channel |
| 23 | Common circuit |
| 24 | Common circuit |
| 25 | Outer surface |
| 26 | Inner surface |
| 27 | Space |
| 28 | Rotating stop |
| 29 | Housing |
| 30 | Slider |
| 31 | Cable grommet |
| 32 | Housing |
| 33 | Flange |

| Key to Reference Numbers: | |
|---|---|
| 34 | External contact |
| 35 | Seal |
| 36 | Fixing hole |

The invention claimed is:

1. A plug-in connection for transmission of electric current, the plug-in connection comprising:
   a male connector and a female connector,
   the male connector comprises a plug-in extension having a plug-in extension jacket wall and electrical contacts, the electrical contacts are arranged in a plug-in extension interior which is enclosed by the plug-in extension jacket wall,
   the female connector comprises a plug-in extension receptacle having a plug-in extension receptacle jacket wall and electrical mating contacts, the electrical mating contacts are arranged in a plug-in extension receptacle interior which is enclosed by the plug-in extension receptacle jacket wall,
   at least one projection is arranged on one of the plug-in extension jacket wall or the plug-in extension receptacle jacket wall, and an other of the plug-in extension jacket wall or the plug-in extension receptacle jacket wall incorporates at least one receptacle slot which matches the projection,
   the plug-in extension, with the projection and the receptacle slot in an undamaged state, is only insertable into the plug-in extension receptacle in one plug-in direction from an unambiguous plug-in position which is defined by the projection and the receptacle slot,
   the male connector, in the plug-in extension interior, further includes at least one moulding,
   the female connector, in the plug-in extension receptacle interior, further includes at least one mating moulding,
   wherein the moulding and the mating moulding, in combination, form a stop mechanism that is adapted to prevent of any electrical contacting of the electrical contacts with the electrical mating contacts due to a plugging of the plug-in extension into the plug-in extension receptacle from a position which deviates from the unambiguous plug-in position,
   the plug-in extension, from the defined plug-in position, is insertable into the plug-in extension receptacle in the plug-in direction to achieve a fully plugged-in position and, from the fully plugged-in position, is rotatable about the plug-in direction into an end position wherein, in the end position, the electrical contacts are electrically contacted with the electrical mating contacts, and
   at least one receptacle channel which extends in a circumferential direction and connects to the receptacle slot in the plug-in extension jacket wall or the plug-in extension receptacle jacket wall in which the receptacle slot is arranged, and the projection is guided in the receptacle channel during rotation from the fully plugged-in position into the end position.

2. The plug-in connection according to claim 1, wherein the moulding incorporates at least one stop face and the mating moulding incorporates at least one mating stop face and, for forming of the stop mechanism, the stop face and the mating stop face, upon insertion of the plug-in extension into the plug-in extension receptacle, in the plug-in direction, from a position which deviates from the defined plug-in position, engage with one another to prevent the electrical contacting of the electrical contacts with the electrical mating contacts, and prevent a complete insertion of the plug-in extension into the plug-in extension receptacle in the plug-in direction.

3. The plug-in connection according to claim 1, wherein the moulding is centrally arranged in the plug-in extension interior at least one of on a longitudinal center line of the plug-in extension or between the electrical contacts.

4. The plug-in connection according to claim 1, wherein the mating moulding is centrally arranged in the plug-in extension receptacle interior at least one of on a longitudinal center line of the plug-in extension receptacle or between the electrical mating contacts.

5. The plug-in connection according to claim 1, wherein the at least one projection comprises a plurality of mutually differently formed, mutually differently positioned, or mutually differently formed and positioned projections arranged on the plug-in extension jacket wall or the plug-in extension receptacle jacket wall, and the other of the plug-in extension jacket wall or the plug-in extension receptacle jacket wall incorporates the at least one receptacle slot which comprises a number of mutually differently formed, mutually differently positioned, or mutually differently formed and positioned receptacle slots, corresponding to the number of projections.

6. The plug-in connection according to claim 1, wherein at least one of an outer surface of the plug-in extension jacket wall or an inner surface of the plug-in extension receptacle jacket wall, except for the projections or the receptacle slots or the at least one receptacle channel arranged thereupon are configured at least partially as circular-cylindrical shells.

7. The plug-in connection according to claim 1, wherein the electrical contacts are arranged on a common circuit of electrical contacts, and the electrical mating contacts are arranged on a common circuit of electrical mating contacts.

8. The plug-in connection according to claim 1, wherein one of the moulding or the mating moulding, at least incorporates a space that is V-shaped in plan view in which the other of the moulding or the mating moulding penetrates upon insertion of the plug-in extension into the plug-in extension receptacle in the plug-in direction, from the defined plug-in position, and the part which penetrates the space is rotatable between two rotating stops in the space.

\* \* \* \* \*